United States Patent
Pfnuer et al.

(10) Patent No.: US 9,692,522 B2
(45) Date of Patent: Jun. 27, 2017

(54) MULTI-CHANNEL OPTICAL RECEIVER OR TRANSMITTER WITH A BALL LENS

(71) Applicant: Cisco Technology, Inc., San Diego, CA (US)

(72) Inventors: Stefan Martin Pfnuer, San Jose, CA (US); Pang-Chen Sun, San Diego, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/687,702

(22) Filed: Apr. 15, 2015

(65) Prior Publication Data

US 2016/0308622 A1  Oct. 20, 2016

(51) Int. Cl.
*H04B 10/00* (2013.01)
*H04B 10/67* (2013.01)
*G02B 6/293* (2006.01)

(52) U.S. Cl.
CPC ......... *H04B 10/676* (2013.01); *G02B 6/2938* (2013.01)

(58) Field of Classification Search
USPC .................................................. 398/135–139
See application file for complete search history.

(56) References Cited

U.S. PATENT DOCUMENTS

| | | | | |
|---|---|---|---|---|
| 4,244,045 A * | 1/1981 | Nosu | ................. | G02B 6/29367 398/86 |
| 5,416,624 A * | 5/1995 | Karstensen | ........ | G02B 6/29361 385/24 |
| 5,498,867 A * | 3/1996 | Senuma | ............. | G01D 5/34776 250/226 |
| 5,611,006 A * | 3/1997 | Tabuchi | ............... | G02B 6/4204 257/432 |
| 5,621,551 A * | 4/1997 | Henderson | ........... | H04N 9/3167 348/E9.027 |
| 5,850,292 A * | 12/1998 | Braun | ...................... | G01J 3/36 250/226 |
| 5,920,411 A * | 7/1999 | Duck | ................. | G02B 6/29364 398/79 |
| 6,075,632 A * | 6/2000 | Braun | ............. | H04B 10/07953 359/634 |
| 6,219,470 B1 * | 4/2001 | Tu | ........................ | G02B 6/4204 385/14 |
| 6,344,846 B1 * | 2/2002 | Hines | .................. | G06F 3/03543 345/156 |
| 6,493,121 B1 * | 12/2002 | Althaus | ................ | G02B 6/4246 398/135 |
| 6,509,989 B1 * | 1/2003 | Tsumori | ............. | G02B 6/29361 398/135 |
| 6,515,776 B1 * | 2/2003 | Naganuma | ......... | G02B 6/29367 398/82 |

(Continued)

*Primary Examiner* — Agustin Bello
(74) *Attorney, Agent, or Firm* — Patterson + Sheridan LLP

(57) ABSTRACT

Embodiments herein describe an optical receiver that demultiplexes a multi-wavelength optical signal into a plurality of optical signals with respective wavelengths. Stated differently, the various wavelengths in the received optical signal are separated into different optical signals with different wavelengths. In one embodiment, the optical receiver includes a plurality of optical filters that is aligned with a mirror to perform the demultiplexing function. The embodiments herein disclose optical receivers where the optical components performing the demultiplexing function using a ball lens aligned with optical filters.

20 Claims, 10 Drawing Sheets

(56) References Cited

U.S. PATENT DOCUMENTS

| | | | | |
|---|---|---|---|---|
| 6,636,658 B2* | 10/2003 | Goodman | G02B 6/2713 | 385/24 |
| 6,741,393 B1* | 5/2004 | Neumann | G02B 6/29365 | 359/578 |
| 6,765,724 B1* | 7/2004 | Kramer | G02B 5/1866 | 356/328 |
| 6,870,976 B2* | 3/2005 | Chen | G02B 6/29367 | 264/1.1 |
| 6,941,047 B2* | 9/2005 | Capewell | G02B 6/29367 | 385/33 |
| 6,941,072 B2* | 9/2005 | Wu | G02B 6/29367 | 398/83 |
| 6,954,592 B2* | 10/2005 | Tan | G02B 6/4206 | 398/135 |
| 7,058,257 B2* | 6/2006 | Pan | G02B 6/29367 | 385/24 |
| 7,085,492 B2* | 8/2006 | Ibsen | G01J 3/02 | 398/33 |
| 7,177,493 B2* | 2/2007 | McGuire, Jr. | G02B 6/356 | 385/11 |
| 7,203,426 B2* | 4/2007 | Wu | G02B 6/4246 | 359/199.1 |
| 7,260,328 B2* | 8/2007 | Kropp | G02B 6/29367 | 385/47 |
| 7,286,743 B2 | 10/2007 | Soskind et al. | | |
| 7,309,174 B2 | 12/2007 | Farr | | |
| 7,415,210 B2* | 8/2008 | Gurevich | H04B 10/40 | 398/83 |
| 7,466,502 B2* | 12/2008 | Morris | G02B 6/29367 | 359/811 |
| 7,509,048 B2* | 3/2009 | Turpin | G02B 6/2861 | 398/83 |
| 7,556,439 B2* | 7/2009 | Nakanishi | G02B 6/4246 | 385/24 |
| 7,574,078 B2* | 8/2009 | Wagener | H04Q 11/0005 | 385/16 |
| 7,639,946 B2* | 12/2009 | Bouda | G02B 6/12007 | 398/68 |
| 7,668,422 B2* | 2/2010 | Kropp | G02B 6/29367 | 359/577 |
| 7,672,554 B1* | 3/2010 | Wang | G02B 6/29365 | 385/24 |
| 7,689,075 B2* | 3/2010 | Jenkins | G02B 6/12007 | 359/634 |
| 7,843,644 B1* | 11/2010 | Wang | G02B 6/262 | 359/641 |
| 7,864,423 B2* | 1/2011 | Koeppen | G02B 5/1866 | 359/337.21 |
| 7,933,521 B2* | 4/2011 | Wen | G02B 6/29367 | 398/135 |
| 8,160,451 B2* | 4/2012 | Liu | G02B 6/4201 | 398/135 |
| 8,299,416 B2* | 10/2012 | Arbore | G01N 21/55 | 250/222.2 |
| 8,303,195 B2* | 11/2012 | Adachi | G02B 6/4204 | 385/73 |
| 8,532,445 B2* | 9/2013 | Morris | G02B 6/29367 | 359/237 |
| 8,639,069 B1* | 1/2014 | Helkey | H04Q 11/0005 | 385/16 |
| 9,020,352 B2* | 4/2015 | Shin | G02B 6/29365 | 398/164 |
| 9,118,434 B2* | 8/2015 | Shinada | H04J 14/02 | |
| 9,164,247 B2* | 10/2015 | Amit | G02B 6/4201 | |
| 9,350,454 B2* | 5/2016 | Xu | H04B 10/506 | |
| 2002/0114566 A1* | 8/2002 | Fairchild | G02B 6/29365 | 385/33 |
| 2006/0198576 A1* | 9/2006 | Furusawa | G02B 6/29367 | 385/24 |
| 2008/0118243 A1* | 5/2008 | Wen | G02B 6/4246 | 398/43 |
| 2008/0193135 A1* | 8/2008 | Du | G02B 6/29362 | 398/88 |
| 2008/0292317 A1* | 11/2008 | Wen | G02B 6/29367 | 398/79 |
| 2009/0116838 A1 | 5/2009 | Kihara | | |
| 2010/0165335 A1* | 7/2010 | Tearney | G01N 21/65 | 356/301 |
| 2010/0219327 A1* | 9/2010 | Arbore | G01N 21/55 | 250/206 |
| 2010/0290128 A1* | 11/2010 | Sugitatsu | G02B 27/145 | 359/634 |
| 2013/0028611 A1* | 1/2013 | Amit | G02B 6/4201 | 398/152 |
| 2014/0117254 A1* | 5/2014 | Cobb | A61B 5/14532 | 250/459.1 |
| 2014/0355997 A1 | 12/2014 | Miao et al. | | |
| 2015/0377696 A1* | 12/2015 | Shpunt | G06T 15/00 | 250/216 |

* cited by examiner

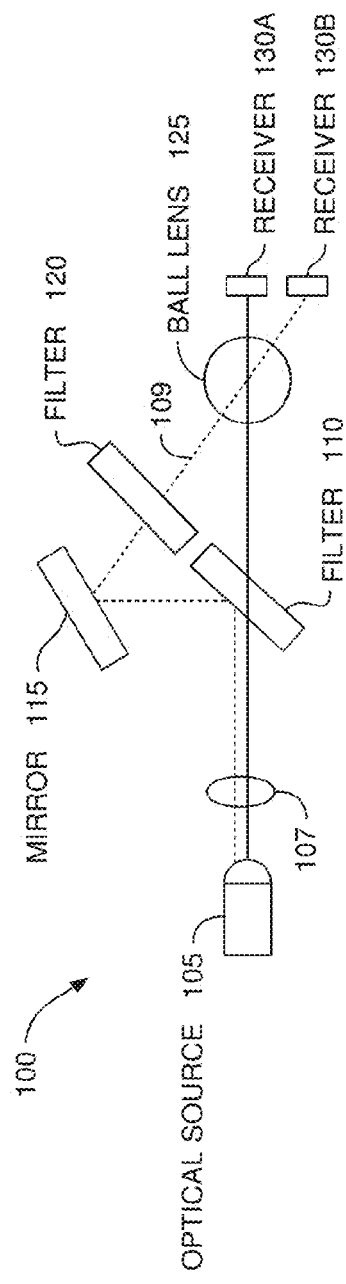
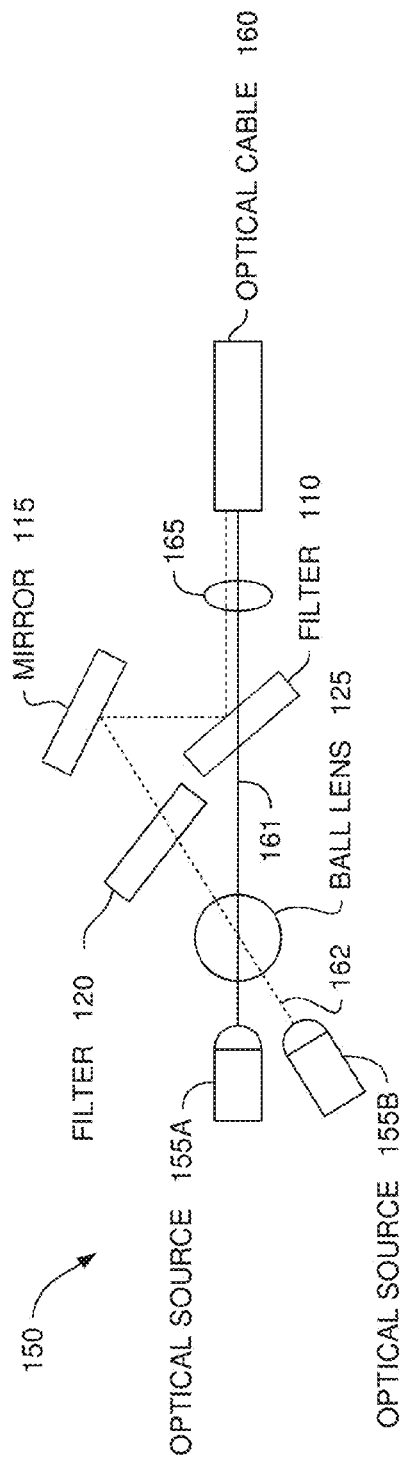
FIG. 1A
FIG. 1B

MULTI-CHANNEL OPTICAL RECEIVER OR TRANSMITTER WITH A BALL LENS

TECHNICAL FIELD

Embodiments presented in this disclosure generally relate to optical structures for muxing/demuxing a multi-wavelength optical signal. More specifically, embodiments disclosed herein use a ball lens and optical filters to demux multi-wavelength optical signals.

BACKGROUND

The cost of Receiver Optical Sub-Assemblies (ROSA) and Transmitter Optical Sub-Assemblies (TOSA) to a large extent is affected by the cost of packaging. The packaging cost in turn is often driven by cost of components used and the need to actively align the optical components within the ROSA/TOSA with high precision and within tight tolerances. Actively aligning these components also affects the cost of the manufacturing equipment, overall quality, yield, and manufacturability.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 1A and 1B illustrate demultiplexing and multiplexing multi-wavelength optical signals, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 2:
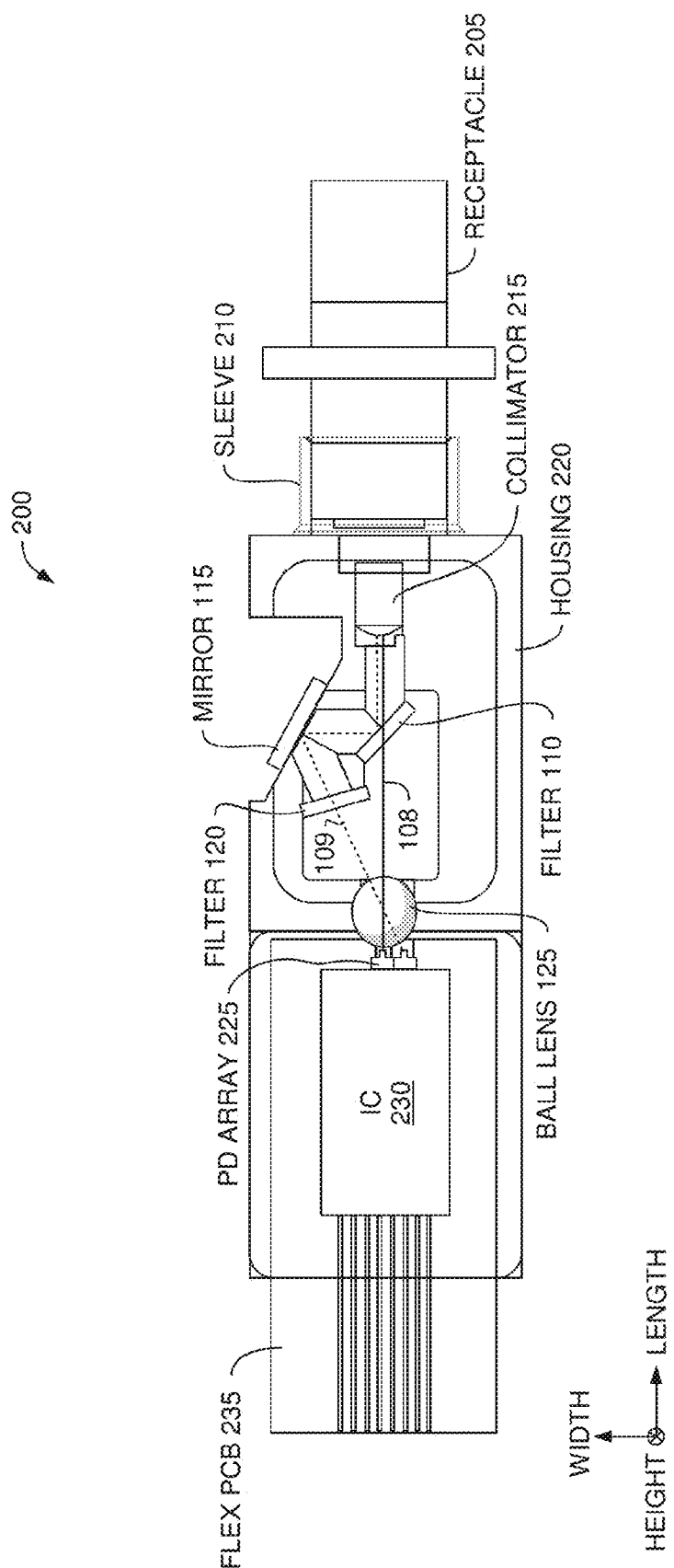
FIG. 2 is an optical receiver for demultiplexing an optical signal using a ball lens, according to one embodiment described herein.

One embodiment presented in this disclosure is an optical receiver that includes an optical source configured to transmit a multiplexed optical signal including a first data signal comprising a first wavelength and a second data signal comprising a second, different wavelength and a first optical filter arranged to receive the multiplexed optical signal from the optical source, where a material of the first optical filter permits the first data signal to pass through the first optical filter and reflects the second data signal. The receiver also includes a mirror arranged to receive the second data signal reflected from the first optical filter and redirect the second data signal and a second optical filter arranged to receive the second data signal after being reflected by the first optical filter, where a material of the second optical filter permits the second data signal to pass through the second optical filter. Further, the receiver includes a ball lens configured to receive the first and second data signals after passing through the first and second optical filters and focus the first and second data signals onto individual detectors.

Another embodiment presented herein a method of fabricating an optical receiver. The method includes disposing, in the optical receiver, an optical source for transmitting a multiplexed optical signal including a first data signal comprising a first wavelength and a second data signal comprising a second, different wavelength and disposing, in the optical receiver, a first optical filter for receiving the multiplexed optical signal from the optical source, where a material of the first optical filter permits the first data signal to pass through the first optical filter and reflects the second data signal. The method includes disposing, in the optical receiver, a mirror for receiving the second data signal reflected from the first optical filter and redirecting the second data signal and disposing, in the optical receiver, a second optical filter for receiving the second data signal after being reflected by the first optical filter, where a material of the second optical filter permits the second data signal to pass through the second optical filter. The method includes disposing, in the optical receiver, a ball lens for receiving the first and second data signals after passing through the first and second optical filters and focusing the first and second data signals onto individual detectors.

Another embodiment described herein is an optical receiver that includes an optical source configured to transmit a multiplexed optical signal including a first data signal comprising a first wavelength and a second data signal comprising a second, different wavelength and an optical filter arranged to receive the multiplexed optical signal from the optical source, where a material of the optical filter permits the first data signal to pass through the optical filter and reflects the second data signal. The receiver includes a mirror arranged to receive the second data signal reflected from the optical filter and redirect the second data signal and a ball lens configured to receive the first data signal after passing through the optical filter, receive the second data signal after being redirected by the mirror, and focus the first and second data signals onto individual detectors.

Example Embodiments

In a ROSA, a received multi-wavelength optical signal is demultiplexed into a plurality of optical signals with respective wavelengths. Stated differently, the various wavelengths in the received optical signal are separated into different optical signals with different wavelengths. In a TOSA, multiple optical signals with respective wavelengths may be multiplexed into a single multi-wavelength optical signal. In one embodiment, these optical devices include a plurality of optical filters that is aligned with one or more mirrors to perform the multiplexing/demultiplexing function. The embodiments herein disclose optical devices where the optical components perform the multiplexing/demultiplexing function using a ball lens aligned with optical filters.

FIGS. 1A and 1B illustrate demultiplexing and multiplexing multi-wavelength optical signals, according to embodiments described herein. FIG. 1A illustrates a ROSA 100 that includes an optical source 105, two optical filters 110, 120, a mirror 115, ball lens 125, and detectors 130. The ROSA 100 demultiplexes a multiplexed signal 107 outputted by the optical source 105. Put differently, the ROSA 100 separates the multiplexed signal 107 into a plurality of optical signals with different wavelengths. In this embodiment, the multiplexed signal 107 includes two different wavelengths (also referred to as channels) that are individually represented by the solid and dashed lines.

The optical source 105 may be an optical fiber, receptacle, collimator, lens, etc. that transmits the multiplexed optical signal 110 in a direction towards the optical filter 110. Because there are two different wavelengths in the multiplexed signal 107, the ROSA 100 includes two different optical filters 110, 120 with respective pass bands for different wavelengths. Specifically, the optical filters 110, 120 permit respective ranges of wavelengths to pass therethrough but reflect all other wavelengths. As such, the optical filters 110, 120 may be made with different layer stack, thicknesses, or different materials or compositions, and thus, have different pass bands. For example, optical filter 110 permits a different range of wavelengths to pass than optical filter 120. However, the pass bands of the optical filters 110, 120 may overlap. In one embodiment, the optical filters 110, 120 may include thin-film-filters.

As shown, the multiplexed signal 107 strikes optical filter 110 which permits one of the wavelengths of the signal 107 to pass through the filter 110 thereby generating a first output signal 108. That is, optical filter 110 has a pass band range that includes only one of the two wavelengths in the multiplexed signal 107. Thus, the optical energy with this wavelength passes through the material of the optical filter 110, while the other wavelength is reflected towards mirror 115. The mirror 115 is arranged such that the remaining wavelength of the multiplexed signal 107 is reflect towards the optical filter 120 which permits the remaining optical energy in the signal 107 to pass, thereby generating a second output signal 109. Although FIG. 1A shows the filter 120 between the mirror 115 and the ball lens 125, in other embodiments, the filter 120 is located between the filter 110 and the mirror 115 such that the optical signal 109 passes through the filter 120 before reaching the mirror 115.

Both output signals 108, 109 are transmitted through the balls lens 125 which focuses the signals 108, 109 onto respective receivers 130. That is, the ball lens 125 focuses the first output signal 108 onto receiver 130A and the second output signal 109 onto receiver 130B. In one embodiment, the receivers 130 are photodiodes that perform an optical-to-electrical transformation to generate electronic data signals representing the information carried in the two channels comprising the multiplexed signal 107. Alternatively, the receivers 130 may be waveguides such as optical fibers that carry the demultiplexed signals 108, 109 to other parts of the ROSA 100.

In one embodiment, the receivers 130 are located within a depth of focus of the ball lens 125 so that the optical signals 108, 109 are focused onto the receivers 130. Moreover, the signals 108, 109 do not interfere with each other even if they pass through the same portion of the ball lens 125 (e.g., through a center of the ball lens 125). Generally, the material of the ball lens 125 is an optically transmissive material such as glass, quartz, sapphire, silicon, or plastic.

Moreover, although this disclosure refers to the output signals 108, 109 as having respective wavelengths, in some embodiments these output signals may include a range of respective wavelengths. However, in one embodiment, the range of the wavelengths of the output signals 108, 109 may be non-overlapping—i.e., unique relative to one another.

FIG. 1B illustrates a TOSA 150 that includes optical sources 155, the two optical filters 110, 120, mirror 115, ball lens 125, and an optical cable 160. Generally, the TOSA 150 uses the optical filters 110, 120, mirror 115, and ball lens 125 to combine (i.e., multiplex) two optical signals 161, 162 provided by the sources 155 into a multi-wavelength optical signal 165. The two optical signals 161, 162 may be considered as two data channels that are combined to generate the multiplexed signal 165. Of course, although FIGS. 1A and 1B illustrate two channel optical systems, the embodiments herein may be used when multiplexing or demultiplexing any number of channels.

The optical sources 155 may be modulated lasers, collimators, optical cables, and the like which respectively output the signals 161, 162. As discussed, each of the optical signals 161, 162 include a wavelength (or range of wavelengths) different from the wavelengths of the other signal. By reversing the demultiplexing process, the TOSA 150 can combine the two optical signals 161, 162 into the multiplexed signal 165.

Optical source 155A outputs optical signal 161 (illustrated by the solid line) which may be a divergent optical signal that passes through the ball lens 125. The lens 125 may collimate the optical signal 161. Because the signal 161 is within the pass band of filter 110, the optical signal 161 passes through the filter 110 and into the optical cable 160.

Optical signal 162 outputted by source 155B propagates through ball lens 125 and into optical filter 120 which may collimate the signal 162. Because the signal 162 is within the pass band of filter 120, the optical signal 162 passes therethrough. In one embodiment, optical filter 120 may be omitted (e.g., to save costs) but doing so may decrease performance since the filter 120 can protect against unwanted back reflections originating from the optical cable 160 that may be caused by optical signal 161 emitted from optical source 155A.

Mirror 115 reflects signal 162 onto the filter 110. However, because signal 162 is not within the pass band of filter 110, the filter 110 reflects signal 162 in a manner such that the optical signals 161 and 162 share the same direction of propagation or optical axis, thereby combination signals 161 and 162 to form the multiplex signal 165 which is then transmitted on the optical cable 160. Although FIG. 1B shows optical filter 120 between ball lens 125 and mirror 115, in another embodiment, the filter 120 is located between mirror 115 and filter 110.

The figures and discussion which follows describe using a ball lens and optical filters to demultiplex a signal in an optical receiver (e.g., a ROSA). Nonetheless, similar principles may be used to generate a multiplexed optical signal in an optical transmitter such as the TOSA illustrated in FIG. 1B.

FIG. 2 is an optical receiver 200 for demultiplexing an optical signal using a ball lens, according to one embodiment described herein. The receiver 200 includes a receptacle 205 that aligns an optic cable (not shown) with a housing 220. As shown, the receiver 200 includes a sleeve 210 which receives the receptacle 205. The sleeve 200 and receptacle 205 may be laser welded once aligned.

The receptacle 205 outputs a multiplexed signal into the housing 220 which is received by a collimator 215 which collimates the multiplexed signal. Like in FIG. 1A, optical filter 110 has a pass band that only permits one of signals (i.e., optical signal 108) in the multiplexed signal to pass through, while the other signals (i.e., optical signal 109) is reflected towards mirror 115. The mirror redirects signal 109 towards the optical filter 120 and the ball lens 125. Because the optical signal 109 is within the pass band of the filter 120, it permits the signal 109 to propagate through the filter 120 substantially unaffected.

The ball lens 125 receives the collimated optical signals 108 and 109 and focuses them onto respective detectors in a photodiode (PD) array 225. In one embodiment, the signals 108 and 109 both propagate through the center of the ball lens. However, the signals 108 and 109 do not interfere with each other. By using the ball lens 125, the receiver 200 avoids expensive lens arrays.

In one embodiment, the PD array 225 includes as many detectors as there are optical signals in the multiplexed signal. Thus, each demultiplexed signal is individually detected by a corresponding detector in the array 225 which transforms one of the optical signals 108, 109 into an electrical signal. The PD array 225 may transmit the electrical signals generated by the detectors to an integrated circuit (IC) 230 for processing.

After processing the electrical signals, IC 230 uses a flex printed circuit board (PCB) 235 to forward the electrical signals to a computing device coupled to the receiver 200. For example, the receiver 200 may facilitate optical data communication between computing devices. Although not shown, the multiplexed signal may be transmitted to the receiver 200 using an optical cable connected to an optical transmitter. The transmitter may receive electrical signals representing different data streams from a computing device, generate a multiplexed optical signal where each channel in the signal corresponds to a data stream, and transmit the multiplexed optical signal along the optic cable. In this manner, the receiver 200 may be used to facilitate data communication between two computing devices.

In one embodiment, the width of the transceiver 200 may be less than or equal to 6 mm and the height may range from 4-6 mm. Further, the length of the receiver 200 may be approximately 10 mm. With these dimensions, the transceiver 200 may be used as a QSFP or SFP+ receiver.

The diameter of the ball lens 125 may range from 1-5 mm depending on lens material and the size of the PDs. The ball lens 125 may generate a focus beam at the PDs in the array 225 with a spot size of less than 15 microns (at 86% intensity). The large depth of focus of the ball lens 125 (approximately 200 microns) allows optimized coupling to two, three, or four detectors (depending on the number of channels in the multiplexed signal) within a planar surface of the PD array 225. Even when one of the optical signals (i.e., signal 108) is perpendicular to a plane of the PD array 225 facing the ball lens 125, the large depth of focus of the lens 125 permits other PDs which receive optical signals (i.e., optical signal 109) at an incident angle that are non-perpendicular to the plane of the PD array 225 to still detect the optical signals—e.g., the spot size on the PDs remain within operational limits. Stated another way, as the optical signals strike the PDs at incident angles that are more parallel to the plane of the array 225 facing the ball lens, the spot sizes of the optical signals become more elliptical. In one embodiment, the major axis of the spot size of optical signal 109 may be less than a diameter of a sensing region of the PD such that substantially all of the spot size is within the sensing region of the PD. However, in other embodiments, even if the spot size of signal 109 exceeds the dimensions of the sensing region of the PD, the resulting electrical signal may be suitable enough to permit operation.

As discussed below, in one embodiment, this distortion caused by the optical signal striking the PD array 225 at a non-perpendicular incident angle is split between the spot size of optical signal 108 (which is spherical in FIG. 2) and the spot size of the optical signal 109 (which is elliptical).

Figure 3A:
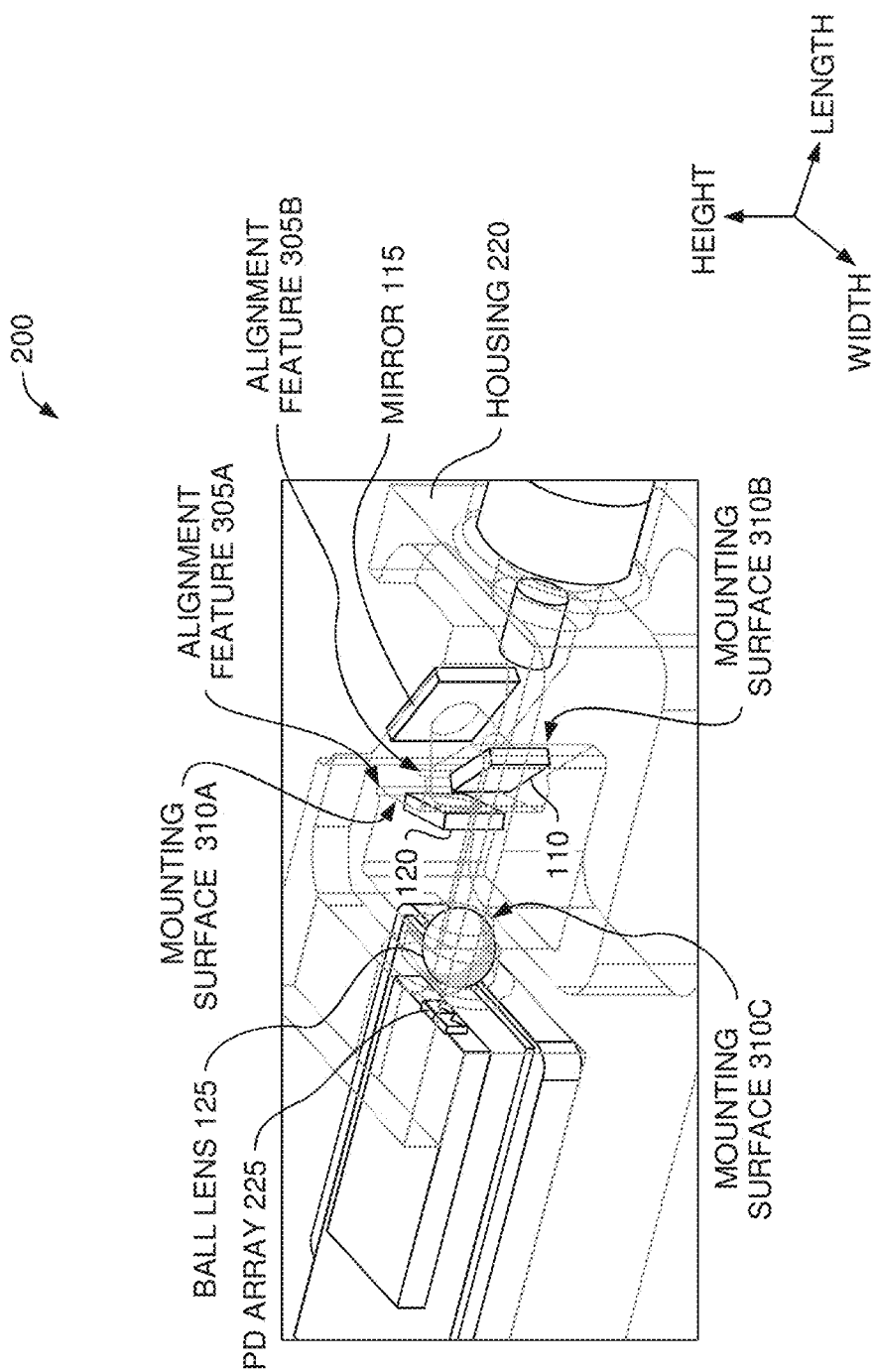
FIGS. 3A and 3B are plan views of the optical receiver shown in FIG. 2, according to embodiments described herein.
Figure 3B:
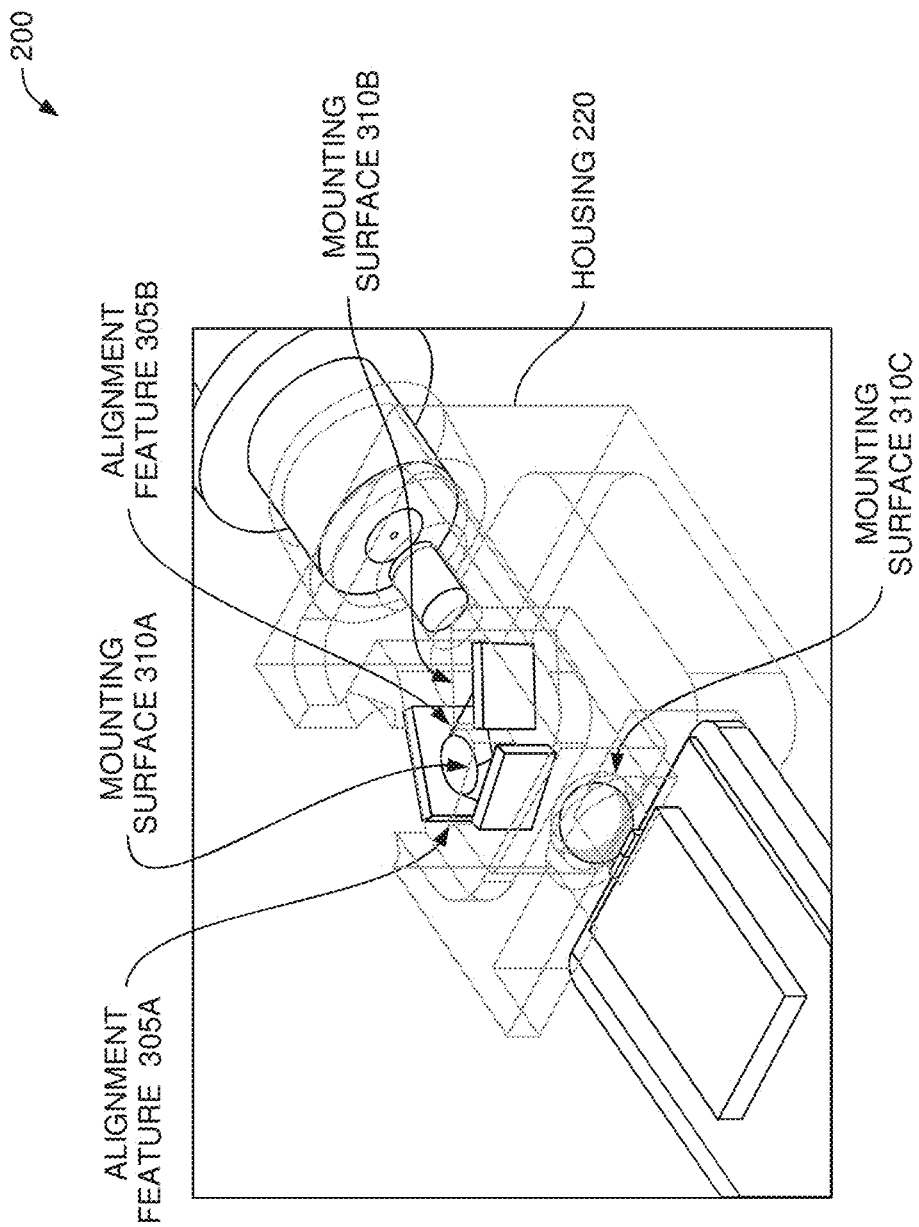

FIGS. 3A and 3B are plan views of the optical receiver 200 in FIG. 2, according to embodiments described herein. In FIG. 3A, housing 220 includes multiple tunnels or paths that permit the optical signals to propagate. For example, the housing 220 may be made up of an opaque material (e.g., metal), and thus, includes the tunnels so that the signals can be transmitted between the filters 110, 120, mirror 115, and ball lens 125.

To align the optical components in the receiver 200, the housing 220 includes a plurality of alignment features 305 and mounting surfaces 310. In one embodiment, the alignment features 305 and mounting surfaces 310 are formed when the housing 220 is manufactured. That is, the housing 220 may be manufactured within desired tolerances such that the features 305 and surface 310 are precisely aligned relative to each other. These features 305 and surfaces 310 may be used to actively and/or passively align the filters 110, 120, mirror 115, and ball lens 125.

As shown, receiver 200 includes alignment features 305A and 305B for aligning the optical filters 110 and 120, respectively. In this embodiment, the features 305A and 305B include corners for receiving corresponding corner of the filters 110 and 120. For example, alignment feature 305A defines a corner between the mounting surface 310A and a side mounting surface (not labeled). By disposing filter 120 into the alignment feature 305A, a front surface of the filter 120 facing the mirror 125 is disposed on the mounting surface 310A while a side surface of the filter 120 facing away from filter 110 is aligned with the side mounting surface. In this manner, the alignment feature 305A enables a technician to align the filter 120 to the mounting surface 310A. The alignment features 305B performs a similar function for filter 110. There, the feature 305B ensures that a front surface of filter 110 facing the mirror 115 is flush with mounting surface 310B while a side surface of filter 110 facing filter 120 is flush with a side mounting surface (not labeled). In other embodiments, the mounting surfaces 310 are referred to as alignment stops integrated into the housing 220.

The housing 220 also includes a cylindrical mounting surface 310C for aligning ball lens 125 with the rest of the optical components. For example, mounting surface 310C may be formed such that when the ball lens 125 is disposed within the this surface, the lens 125 is aligned with the filters 110, 120 so that optical signals passing through the filters 110, 120 cross at the center of the ball lens 125.

FIG. 3B illustrates a different perspective of the receiver 200 relative to the view shown in FIG. 3A. For clarity, the same alignment features 305 and mounting surfaces 310 discussed above are illustrated in FIG. 3B, and thus, are not described in detail here.

Figure 4:
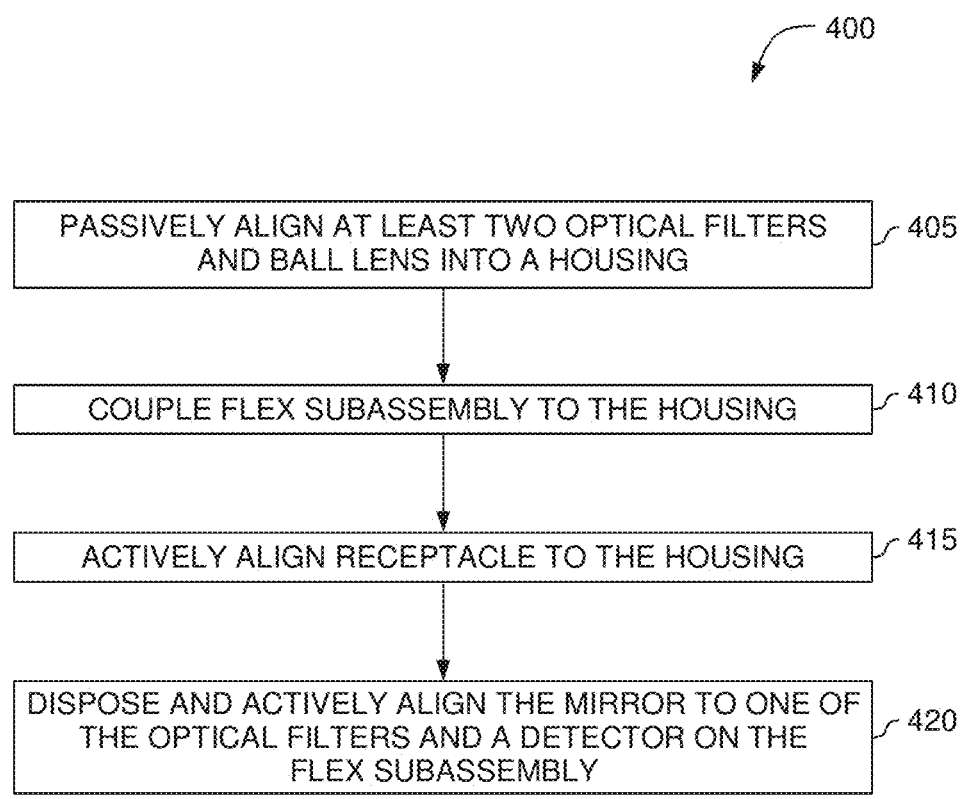
FIG. 4 is a method for assembling an optical receiver, according to one embodiment described herein.

FIG. 4 is a method 400 for assembling an optical receiver, according to one embodiment described herein. At block 405, the optical filters and ball lens are passively aligned in the housing. In one embodiment, a technician disposes the optical filters on one or more mounting surfaces provided by the housing as shown in FIGS. 3A and 3B. To ensure proper placement onto the mounting surfaces, the housing may include alignment features at the corners between mounting surfaces. With respect to the ball lens, the housing may include a cylindrical mounting surface that receives the ball lens. The diameter of the cylindrical mounting surface may be set such that when the ball lens contacts the surface it is correctly spaced from the optical filters so that the ball lens focuses received optical filters onto respective detectors on the PD array. As used herein, passive alignment means that two or more components can be aligned without having to transmit and measure an optical signal in order to ensure proper alignment.

At block 410, the flex subassembly is coupled to the housing. Referring again to FIG. 2, the flex PCB 235, IC 230, and PD array 225 may be pre-assembled to form the flex-subassembly. In one example, the PD array 225 has electrical connections to IC 230 and/or flex PCB 235 which may be formed using wire bonds. Similarly, IC 230 may be electrically connected to flex PCB 235 using wire bonds and/or solder bumps. To connect the flex sub-assembly to the housing, an epoxy or weld may be used. In one embodiment, the flex subassembly is passively aligned to the housing. As such, the housing may include alignment stops or mounting surfaces that ensure the PD array in the flex subassembly is aligned with the ball lens such that the ball lens focuses optical signals onto the detectors in the array.

At block 415, the receptacle is actively aligned to the housing. To do so, the technician may output a test optical signal from the receptacle 205 that is within the pass band of the optical filter 110 so that the test signal passes through the filter 110 an into the ball lens 125 as shown in FIG. 2. By measuring the electrical signal detected by a PD in the array 225, the technician adjusts the position of the receptacle 205 relative to the housing 220. When the electrical signal is within a predefined threshold, the technician fixes the receptacle 205 to the sleeve 210 and housing 220. For example, the receptacle 205 may be laser welded to the housing 220. At the completion of block 415, the optical path illustrated by the solid line in FIG. 2 is aligned and ready for operation.

At block 420, the mirror is disposed onto the receiver and actively aligned to an optical filter. Again referring to FIG. 2, the mirror 115 is aligned such that the optical signal reflected from optical filter 110 is redirected to optical filter 120 and ball lens 125 such that the optical signal strike a PD on the array 225. For example, the technician may output a test optical signal using receptacle 205 that is outside the pass band of optical filter 110. As such, filter 110 reflects the test signal to the mirror 125. By adjusting the relative position of the mirror 115 to the housing 220, the technician changes where the test signal strikes the PD. The technician can adjust the position of the mirror 115 until the electrical signal outputted by the PD achieves a threshold level. The technician then fixes the position of the mirror 115 onto the housing using an adhesive material—e.g., an epoxy. Thus, at the completion of block 420, the optical path illustrated by the dashed line in FIG. 2 is aligned and ready for operation.

Figure 5:
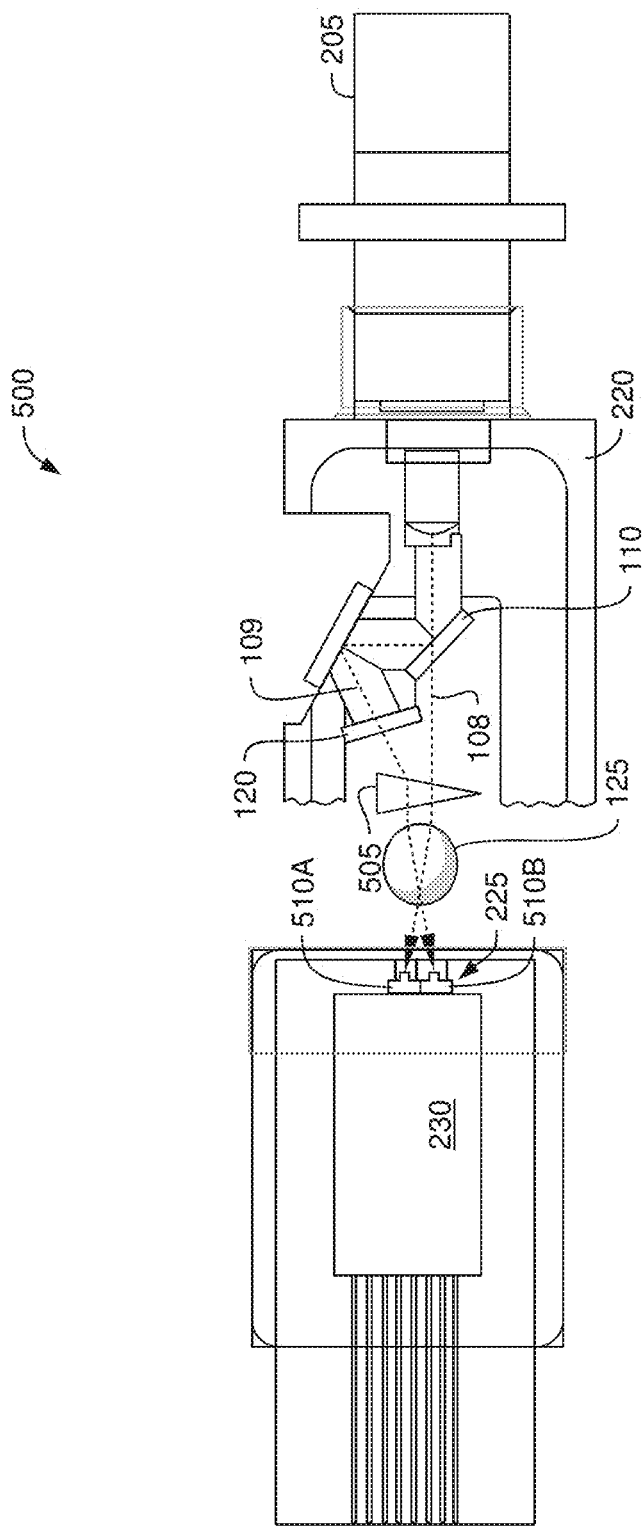
FIG. 5 is an optical receiver for demultiplexing an optical signal using a ball lens, according to one embodiment described herein.

FIG. 5 is an optical receiver 500 for demultiplexing an optical signal using a ball lens, according to one embodiment described herein. Instead of permitting optical signals 108 and 109 to propagate from the optical filters 110, 120 directly to the ball lens 125, receiver 500 includes a prism 505 disposed between the optical filters 110, 120 and the ball lens 125. As shown, the structure and arrangement of the housing 220 to the right of the prism 505 is the same as the arrangement shown in FIG. 2. However, the portion of the receiver 500 to the left of the prism may be arranged differently. For example, instead of aligning the ball lens 125 such that the center of the lens 125 is aligned with the optical axis of signal 108 when this signal leaves the optical filter 110, in receiver 500 the ball lens 125 is shifted up relative to the position of the ball lens 125 in FIG. 2.

After redirecting the optical signals 108, 109 using prism 505, the balls lens 125 focuses the signals 108, 109 onto PD 510A and PD 510B in array 225. Specifically, optical signal 108 strikes PD 510A, while optical signal 109 strikes PD 510B. However, unlike in FIG. 2 where optical signal 108 strikes the PD array 225 in a direction perpendicular to the plane of the array 225 facing the ball lens 125, here the optical signals 108, 109 both strike the respective PDs 510 at non-perpendicular incident angles. Because of these angles, the beam spots of the signals 108, 109 on the PDs 510 are elliptical rather than spherical. By using the prism 505, this elliptical distortion is shared by both beam spots rather than one. For example, if the incident angle shown in FIG. 2 of optical signal 109 is 10 degrees off from perpendicular, by using prism 505, this angle can be split between the signals 108, 109 so that both signals strike the PDs 510 at an angle that is 5 degrees off from perpendicular. Doing so prevents one optical signal from including all of the distortion cause by the non-perpendicular incident angle on the PD array 225. By spreading out the beam spot distortion on both optical signals 108, 109, the receiver 500 may be able to use PDs 510 with smaller detection areas, thereby reducing the RC constant of the PDs and enabling higher data speeds (i.e., high frequency optical signals). In addition both PDs 510 are more equal distance to the ball lens 125 allowing a lens design that has less depth of focus and a smaller focal point. Doing so is especially helpful for accommodating smaller sized PDs 510.

Figure 6:
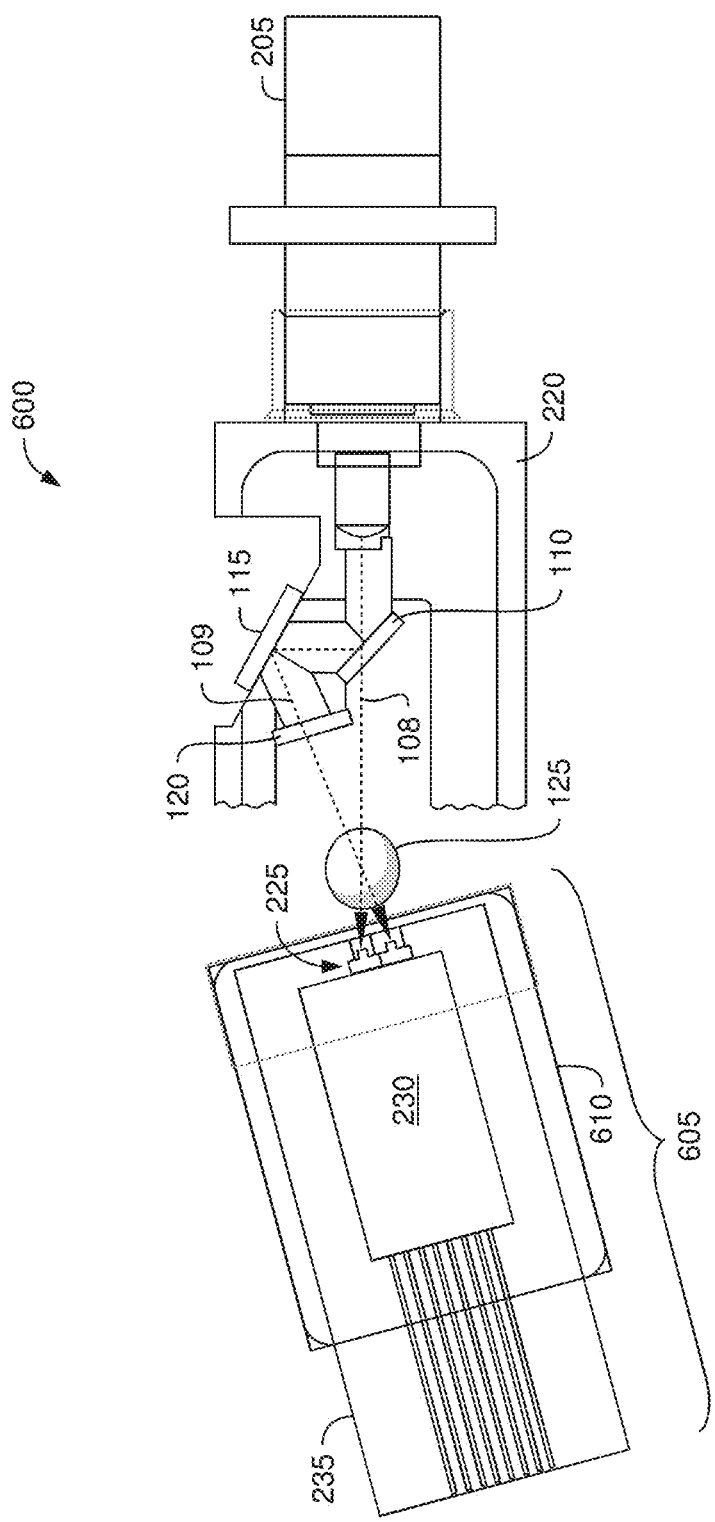
FIG. 6 is an optical receiver for demultiplexing an optical signal using a ball lens, according to one embodiment described herein.

FIG. 6 is an optical receiver 600 for demultiplexing an optical signal using a ball lens 125, according to one embodiment described herein. The receiver 600 achieves a similar result as the receiver 500 in FIG. 5 where the beam spot distortion is shared by both optical signals 108, 109 but without using a prism. As shown, receiver 600 has the same structure and arrangement as receiver 200 in FIG. 2 to the right of the ball lens 125. However, instead of the flex PCB 235 extending in the same direction as housing 220 and receptacle 225, the flex PCB 235, IC 230 and flex stiffener 610 (collectively labeled flex sub-assembly 605) is offset relative to the propagation direction of optical signal 108. Doing so results in the optical signal striking the PD array 225 at a non-perpendicular incident angle. Moreover, offsetting the flex sub-assembly 605 reduces the incident angle of optical signal on the PD array 225 relative to the angle shown in FIG. 2. In another embodiment, PD array 225 and IC 230 are rotated as shown, while flex PCB 235 is straight—i.e., extends in the same direction as the housing 220 and receptacle 225. Or furthermore, only PD array 225 may be rotated on the flex PCB 235, while IC 230 and flex PCB 235 are straight—i.e., extend in the same direction as housing 220 and receptacle 225. In either case there will be an electrical bend in flex PCB or wire bond connection between PD and IC that allows only a subset of components of 605 to be rotated. This will help with dimensional constraints of the complete package.

For example, if the incident angle of the optical signal 109 in FIG. 2 on the PD array 225 is 10 degrees, offsetting the flex sub-assembly 605 by 5 degrees relative to the housing 220 as shown in FIG. 6 reduces the incident angle of optical signal 109 to 5 degrees on the PD array 225. Simultaneously, offsetting the flex sub-assembly 605 causes the incident angle of optical signal 108 on the PD array 125 to increase to 5 degrees relative to being perpendicular. Thus, like in FIG. 5, the beam spot distortion is shared by both optical signals 108, 109. However, the beam spot distortion does not need to be shared equally between the two optical signals 108, 109. That is, the non-perpendicular incident angles of the optical signals 108, 109 on the PD array 225 may be different—e.g., optical signal 108 is offset from being perpendicular to the PD array 225 by 3 degrees, while optical signal 109 is offset by 7 degrees.

Figure 7:
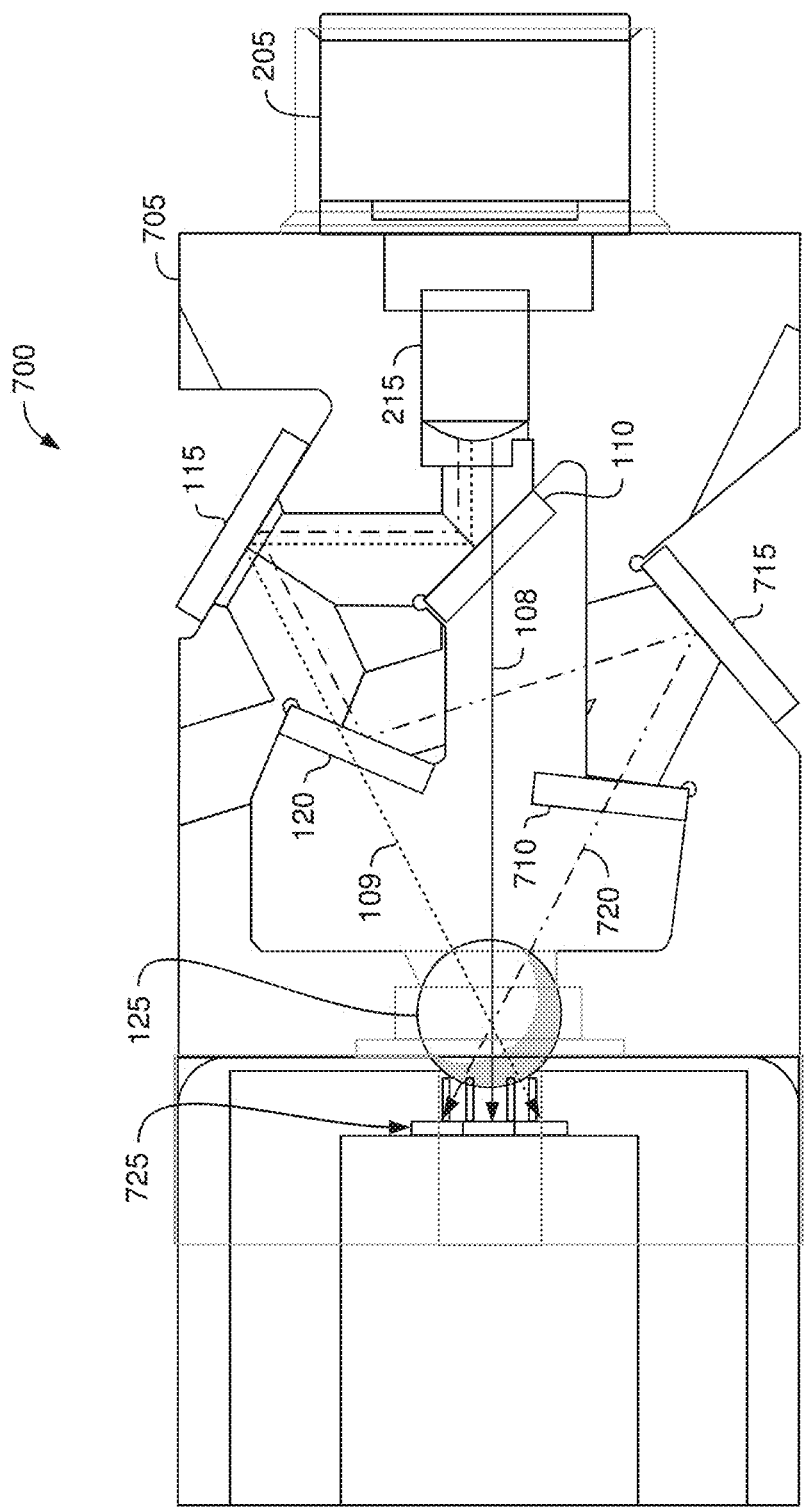
FIG. 7 is an optical receiver for demultiplexing an optical signal using a ball lens, according to one embodiment described herein.

FIG. 7 is an optical receiver 700 for demultiplexing an optical signal using a ball lens, according to one embodiment described herein. Instead of demultiplexing a two-channel multiplexed signal, receiver 700 has a housing 705 designed to demultiplex a three-channel multiplexed signal. As shown, the collimator 215 receives the three-channel signal from the receptacle 205 and outputs a collimated optical signal towards the filter 110. As above, the pass band of the filter 110 permits only one of the channels (i.e., optical signal 108) to pass while the other two channels (i.e., optical signals 109 and 720) are reflected to mirror 115. That is, the optical filter 110 removes one of the channels from the multiplexed signal and reflects a two-channel multiplexed signal to mirror 115.

The mirror 115 directs the multiplexed signal to optical filter 120 which permits only optical signal 109 to pass and reflects optical signal 720. The housing 705 includes mirror 715 and optical filter 710 for transmitting optical signal 720 to the ball lens 125. Moreover, the housing 705 may include various alignment features and mounting surfaces like the ones discussed above that permit the optical filter 710 to be passively aligned and the mirror 715 to be actively aligned. Because the optical signal 720 is within the pass band of the filter 720, the signal 720 passes through the filter 720 and is received by the ball lens 125.

The ball lens 125 receives all three signals 108, 109, 720 and focuses these signals onto respective detectors in the PD array 725. Thus, the PD array 725 may include three PDs with sensing regions for detecting the beam spots made by optical signal 108, 109, 720. In this embodiment, optical signal 108 strikes the PD array 725 at an angle perpendicular to the plane of the PD array 725 facing the ball lens 125, while optical signals 109, 720 strike the PD array 725 at angles that are non-perpendicular with this plane. Thus, the beam spot of optical signal 108 on the PD array 725 may be more spherical than the beam spots of signals 109, 720 which have some elliptical distortion. In any case, the distance between the ball lens 125 and the detectors in the PD array 725 may all be within the depth of focus of the ball lens 125. Generally, the smaller the PD array pitch (i.e., the distance between the individual PDs in the array), the greater number of channels that can go through the same ball lens.

Figure 8A:
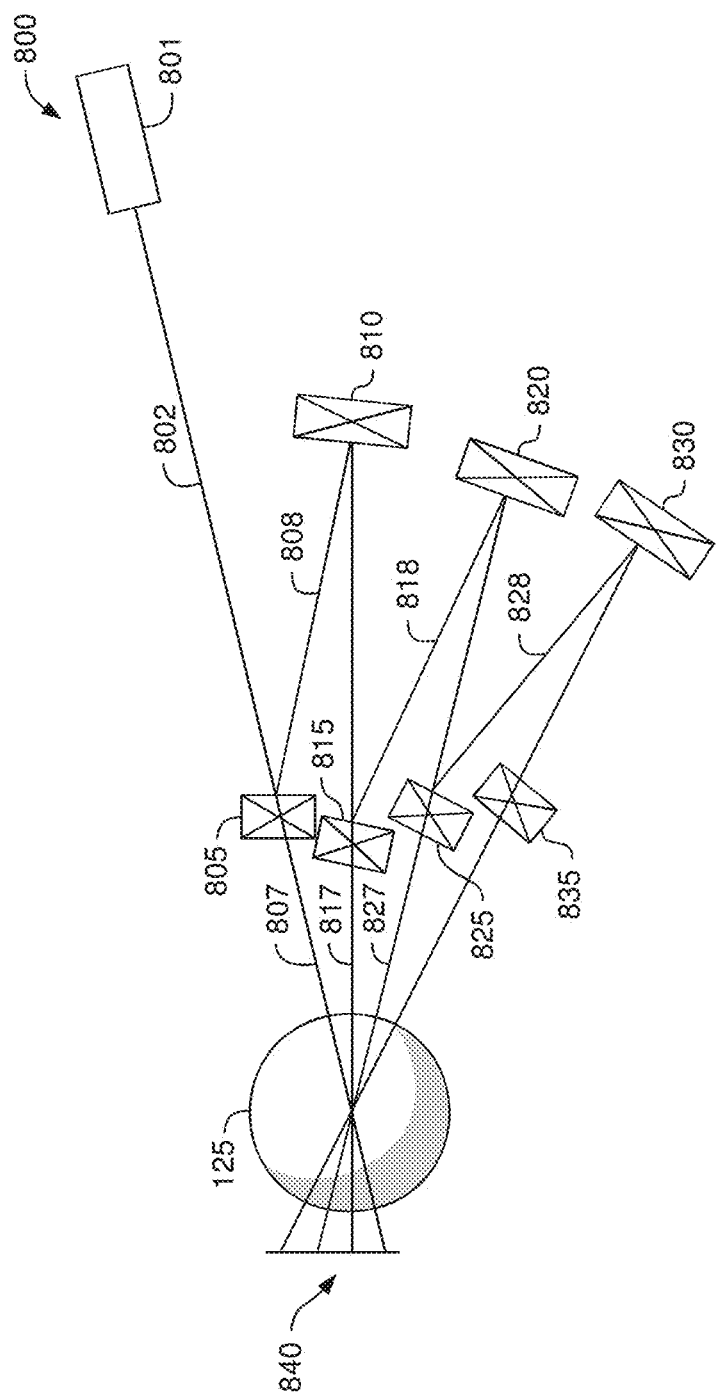
FIGS. 8A and 8B illustrate schematics for demultiplexing an optical signal using a ball lens, according to one embodiment described herein.
Figure 8B:
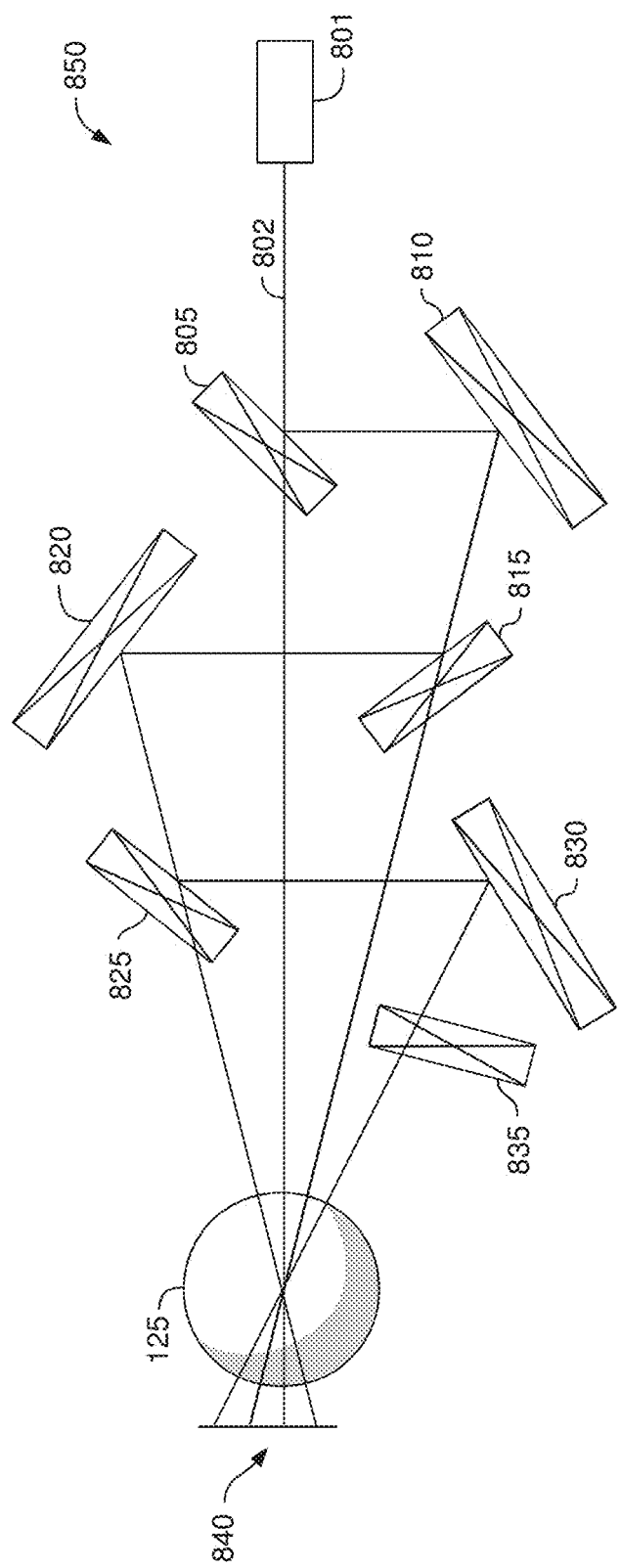

FIGS. 8A and 8B illustrate schematics for demultiplexing an optical signal using a ball lens, according to one embodiment described herein. Specifically, FIGS. 8A and 8B illustrate two embodiments for demultiplexing a four-channel multiplexed signal 802. In FIG. 8A, an optical source 801 (e.g., a collimator (or receptacle with collimating lens), optic cable, lens, etc.) outputs the multiplexed signal 802. An optical filter 805 receives the signal 802 and filters out one of the channels to generate optical signal 807 which pass through the filter 805. The filter 805 reflects the other three channels which are outside of its pass band to generate optical signal 808. Mirror 810 redirects the three-channel multiplexed signal 808 to the optical filter 815 which again removes one of the channels from the multiplexed signal. As shown, optical signal 817 propagates through filter 815 while the remaining two channels are reflected towards mirror 820 as shown by optical signal 818.

Mirror 820 reflects optical signal 818 towards optical filter 825 which removes another channel from the multiplexed signal which propagates through the filter 825 to the ball lens 125. Filter 825 reflects the last channel of the multiplexed signal (shown as optical signal 828) to mirror 830 which redirects the signal 828 through optical filter 835. Finally, optical signal 828 reaches the ball lens 125.

The ball lens 125 receives all four of the optical signals 807, 817, 827, 828 and focuses these signals onto a detector plane 840 which includes individual detectors (PDs) for receiving the signals 807, 817, 827, 828. In one embodiment, the pitch of the detectors is equal to or less than 250 microns which permits four channels to go through the same ball lens 125 and remain within the depth of focus of the lens 125.

In FIG. 8B, the optical source 801 outputs the four-channel multiplexed signal 802. As above, the components in the receiver 850 redirect the optical signals such that optical filters 805, 815, and 825 remove one of the channels from the multiplexed signal 802 until only one channel is left to pass through optical filter 835. In one embodiment, the pitch of the detectors in the detector plane 840 is equal to or less than 250 microns which permits four channels to go through the same ball lens 125 and remain within the depth of focus of the lens 125.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:
1. An optical receiver, comprising:
an optical source configured to transmit a multiplexed optical signal including a first data signal comprising a first wavelength and a second data signal comprising a second, different wavelength;
a first optical filter arranged to receive the multiplexed optical signal from the optical source, wherein a material of the first optical filter permits the first data signal to pass through the first optical filter and reflects the second data signal;
a mirror arranged to receive the second data signal reflected from the first optical filter and redirect the second data signal;
a second optical filter arranged to receive the second data signal after being reflected by the first optical filter, wherein a material of the second optical filter permits the second data signal to pass through the second optical filter; and
a ball lens configured to receive the first and second data signals after passing through the first and second optical filters and focus the first and second data signals onto individual detectors.

2. The optical receiver of claim 1, further comprising:
a photodiode array comprising the detectors, wherein the photodiode array is electrically connected to an integrated circuit.

3. The optical receiver of claim 2, wherein the first data signal strikes the photodiode array in a first direction that is perpendicular to a surface of the photodiode array facing the ball lens, and wherein the second data signal strikes the photodiode array in a second direction that is not perpendicular to the surface.

4. The optical receiver of claim 2, wherein both the first and second data signals strike the photodiode array in a direction that is not perpendicular to a surface of the photodiode array facing the ball lens.

5. The optical receiver of claim 1, further comprising:
a prism disposed between the ball lens and first and second optical filters, wherein the first and second data signals pass through the prism before reaching the ball lens.

6. The optical receiver of claim 1, wherein both the first and second data signals pass through a center of the ball lens.

7. The optical receiver of claim 1, further comprising a printed circuit board electrically coupled to the detectors, wherein the printed circuit board extends away from the ball lens in a direction that is parallel with an optical path traveled by the first data signal when propagating from the first optical filter to the ball lens.

8. The optical receiver of claim 1, further comprising a printed circuit board electrically coupled to the detectors, wherein the printed circuit board extends away from the ball lens in a direction that is offset with an optical path traveled by the first data signal when propagating from the first optical filter to the ball lens.

9. The optical receiver of claim 1, further comprising:
a third optical filter arranged to receive a third data signal of the multiplexed optical signal, the third data signal comprises a third wavelength different from the first and second wavelengths, wherein a material of the third optical filter permits the third data signal to pass through the third optical filter, and wherein, after passing through the third optical filter, the third data signal is received by the ball lens.

10. A method of fabricating an optical receiver, the method comprising:
disposing, in the optical receiver, an optical source for transmitting a multiplexed optical signal including a first data signal comprising a first wavelength and a second data signal comprising a second, different wavelength;
disposing, in the optical receiver, a first optical filter for receiving the multiplexed optical signal from the optical source, wherein a material of the first optical filter permits the first data signal to pass through the first optical filter and reflects the second data signal;
disposing, in the optical receiver, a mirror for receiving the second data signal reflected from the first optical filter and redirecting the second data signal;
disposing, in the optical receiver, a second optical filter for receiving the second data signal after being reflected by the first optical filter, wherein a material of the second optical filter permits the second data signal to pass through the second optical filter; and
disposing, in the optical receiver, a ball lens for receiving the first and second data signals after passing through the first and second optical filters and focusing the first and second data signals onto individual detectors.

11. The method of claim 10, wherein disposing the first and second optical filters in the optical receiver comprises:
passively aligning the first and second optical filters using one or more alignment features in the optical receiver; and
attaching the first and second optical filters to a housing of the optical receiver after being passively aligned.

12. The method of claim 11, wherein the passive alignment is performed without transmitting any test optical signal in the optical receiver.

13. The method of claim 10, wherein disposing the mirror in the optical receiver comprises:
actively aligning the mirror after disposing the first optical filter, second optical filter, and ball lens in the optical receiver; and
attaching the mirror to a housing of the optical receiver after being actively aligned.

14. The method of claim 13, wherein the active alignment is performed by transmitting a test optical signal through the optical receiver and measuring a resulting electrical signal using at least one of the detectors.

15. The method of claim 10, further comprising:
attaching a flex sub-assembly comprising a printed circuit board and the detectors to a housing in the optical receiver, wherein the housing includes the first and second optical filters, the mirror, and the ball lens.

16. The method of claim 15, wherein the mirror is disposed in the optical receiver after attaching the flex sub-assembly to the housing.

17. The method of claim 10, further comprising:
actively aligning, in the optical receiver, a receptacle to the optical source; and
attaching the receptacle to a housing of the optical receiver after being actively aligned.

18. An optical receiver, comprising:
an optical source configured to transmit a multiplexed optical signal including a first data signal comprising a first wavelength and a second data signal comprising a second, different wavelength;
an optical filter arranged to receive the multiplexed optical signal from the optical source, wherein a material of the optical filter permits the first data signal to pass through the optical filter and reflects the second data signal;
a mirror arranged to receive the second data signal reflected from the optical filter and redirect the second data signal; and
a ball lens configured to receive the first data signal after passing through the optical filter, receive the second data signal after being redirected by the mirror, and focus the first and second data signals onto individual detectors.

19. The optical receiver of claim 18, further comprising:
a photodiode array comprising the detectors, wherein the photodiode array is electrically connected to an integrated circuit.

20. The optical receiver of claim 19, wherein the first data signal strikes the photodiode array in a first direction that is perpendicular to a surface of the photodiode array facing the ball lens, and wherein the second data signal strikes the photodiode array in a second direction that is not perpendicular to the surface.

* * * * *

UNITED STATES PATENT AND TRADEMARK OFFICE
CERTIFICATE OF CORRECTION

| | | |
|---|---|---|
| PATENT NO. | : 9,692,522 B2 | Page 1 of 1 |
| APPLICATION NO. | : 14/687702 | |
| DATED | : June 27, 2017 | |
| INVENTOR(S) | : Stefan Martin Pfnuer et al. | |

It is certified that error appears in the above-identified patent and that said Letters Patent is hereby corrected as shown below:

On the Title Page

In item (71), in Column 1, in "Applicant", Line 1, delete "San Diego, CA" and insert -- San Jose, CA --, therefor.

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*